United States Patent
Nishimuro et al.

(10) Patent No.: US 6,383,436 B1
(45) Date of Patent: May 7, 2002

(54) PROCESS FOR PRODUCING INK-JET PRINTER MEMBER

(75) Inventors: Youichi Nishimuro; Kunio Machida, both of Tokyo; Hisashi Miyazawa; Kazunaga Suzuki, both of Nagano-ken, all of (JP)

(73) Assignees: Seiko Epson Corporation; Bridgestone Corporation, both of Tokyo (JP)

( * ) Notice: Subject to any disclaimer, the term of this patent is extended or adjusted under 35 U.S.C. 154(b) by 0 days.

(21) Appl. No.: 09/181,924

(22) Filed: Oct. 29, 1998

(30) Foreign Application Priority Data

Nov. 26, 1997 (JP) ................................. 9-324930

(51) Int. Cl.[7] .............................................. B29C 45/16
(52) U.S. Cl. ..................... 264/245; 264/255; 264/328.8; 425/129.1
(58) Field of Search ............................... 264/245, 247, 264/255, 328.8; 425/129.1

(56) References Cited

U.S. PATENT DOCUMENTS 4,385,025 A * 5/1983 Salerno et al. ............... 264/255
5,922,264 A * 7/1999 Shimmell .................... 264/255
6,130,696 A * 10/2000 Mashita et al. ................ 347/86

FOREIGN PATENT DOCUMENTS

| EP | 0 382 423 | 8/1990 |
| EP | 0 561 051 | 9/1993 |
| EP | 0 705 703 | 4/1996 |
| WO | WO 94/29094 | 12/1994 |

* cited by examiner

*Primary Examiner*—Jan H. Silbaugh
*Assistant Examiner*—Edmund H. Lee
(74) *Attorney, Agent, or Firm*—Oblon, Spivak, McClelland, Maier & Neustadt, P.C.

(57) ABSTRACT

A multi-color injection molding process for producing an ink-jet printer member having a plastic substrate and an elastic material layer that are integrally composited, by melt-injecting into a mold in turn, a material for a plastic substrate and an elastic material composed of a thermoplastic elastomer. The above process is well suited for the production of the ink-jet printer member such as an ink tank valve for supplying a recording head with an ink to be filled in an ink chamber, also of a sealing member which is installed at an ink supply port or on the main body of an ink-jet printer and prevents an ink from leaking through the ink supply port or through the recording head.

6 Claims, 1 Drawing Sheet

(a)            (b)

(a)

(b)

PROCESS FOR PRODUCING INK-JET PRINTER MEMBER

BACKGROUND OF THE INVENTION

1. Field of the Invention

The present invention relates to a process for producing an ink-jet printer member. More particularly, the present invention pertains to a process for efficiently producing an ink-jet printer member which comprises a plastics substrate and an elastic material layer that are integrally composited by means of multi-color injection molding or insert molding.

2. Description of the Related Arts

An ink-jet printer has heretofore been equipped with an ink tank which has an ink chamber to be filled in with an ink and an ink supply portion that supplies a recording head portion with an ink. Examples of types of the ink tanks include a type which is constituted so that an ink is supplied to a recording head which is stationarily attached to a carriage, through tubes arranged everywhere in an ink-jet printer, and an ink tank is freely attachable to and detachable from said priter; a type in which an ink tank is constituted integrally with a recording head, and the resultant integrated unit is freely attachable to and detachable from a carriage; and the like types.

In the former type of the tank, an ink is supplied to the recording head by providing a water head difference therebetween, while in the latter type, an ink is supplied to the recording head by providing the ink tank with a negative pressure generation source.

There have frequently been proposed in recent years, the ink-jet printers which adopt the latter type of the ink tank from the viewpoints of miniaturizing the printer as well as the easiness of maintenance work.

Such an ink tank is required to be capable of favorably supplying an ink in an amount corresponding to the amount of the ink discharged from the recording head at the time of recording, and also to be free from the leakage of an ink through a discharge port at the time of non-recording.

There is available for example, as an ink tank meeting the above-mentioned requirements, an ink tank in the form of cartridge in which a recording head is integrated with an ink tank, and an absorbent(foam) is filled inside the ink tank. It is made possible by such absorbent filled in an ink tank to maintain the ink meniscus at an stable level at the ink discharge portion of the recording head, and at the same time it is made possible by the capillary power of the absorbent to properly preserve the ink in the ink tank. In this case, it is needed that almost entire inside of the ink tank be filled in with the absorbent. Thus by allowing the absorbent to preserve an amount of ink a slightly less than the maximum preservable amount thereof, the capillary power of the absorbent is utilized to generate a negative internal pressure. It is therefore, made possible to minimize the amount of the ink leaking through the discharge portion of the recording head and through the ink tank portion communicating with the atmosphere, even in the case where a mechanical shock such as vibration or a thermal shock such as temperature variation is applied to the recording head or the ink tank.

The aforesaid method in which the ink tank inside is almost entirely filled with an absorbent involves the problems that the negative pressure of the absorbent increases accompanying the consumption of the ink, and increases the amount of the ink remaining in the ink tank without being supplied to the recording head, thereby bringing about a low utilization efficiency of the ink.

In order to solve such problems, an attempt is made, for example, to employ an ink tank valve which is installed at the position dividing an ink chamber and an ink supply portion, and which supplies a recording head with the ink that is moved by the difference in pressure between the ink chamber and the ink supply portion, and is filled in the ink chamber [refer to Japanese Patent Application Laid-Open No. 174860/1996(Hei-8)].

By equipping the ink tank with such an ink tank valve, it is made possible to certainly supply the recording head with the ink, by surely responding to the slight difference in pressure between the ink tank and the recording head without being influenced by the swing of the ink due to the movement of the carriage, while maintaining the negative pressure well suited for printing between the recording head and a recording medium. It is further made possible thereby to prevent the ink from leaking by variation in temperature through the ink supply port or through the recording head.

There is usually used in the ink tank valve, an elastic material, for example a plastics substrate to which an elastic material is adhesively bonded. In the case of producing such a member comprising a plastics substrate and an elastic material adhesively bonded thereto, there has heretofore been adopted a method in which the plastics substrate and the elastic material are each separately produced by molding, and thereafter they are adhesively bonded to each other. The above-mentioned method, however, suffers from the disadvantages of increased number of production steps, complicated operations and a high production cost.

The ink supply port is provided with a sealing member for preventing ink from leaking. Such a sealing member has heretofore been installed by (1) a method in which an adhesive is applied to a plastics member, and then is molded into the form of a sealing member by pressing the same with a metal plate from the upside, (2) a method in which a plastics memeber prepared in advance is equipped with an o-ring made of thermosetting rubber, or a sealing member of a prescribed shape which is blanked from thermosetting rubber in the form of a flat plate or the like, or a sealing member of a prescribed shape which is injection-molded from thermosetting rubber.

Nevertheless the above-mentioned (1) adhesive coating method involves the problems of control of adhesives being troublesome, post-treatment being needed for squeezed out adhesives and the like troubles. On the other hand, the (2) sealing member-equipping method involves the problems of increased number of processing steps due to the necessity of forming in advance a sealing member of a prescribed shape, and an inevitably high production cost and the like.

SUMMARY OF THE INVENTION

Under such circumstances, A general object of the present invention is to provide the technique for solving and overcoming the above-mentioned problems with the conventional process for producing an ink-jet printer member, including a process for producing an ink-jet printer member which comprises adhesively bonding an elastic material to a plastics substrate such as an ink tank valve, or which comprises equipping a plastics substrate with a sealing member and the like process.

As a result of intensive research and investigation accumulated by the present inventors in order to achieve the above-mentioned object, it has been found that said object can be achieved, that is, it is made possible to produce an ink-jet printer member comprising a plastics substrate and an elastic material layer composed of a thermoplastic elastomer that are integrally composited, for example, an ink tank valve and a member having a packing, in simple steps with favorable production efficiency in an economical and advantageous manner. The present invention has been accomplished by the foregoing findings and information.

That is to say, the present invention provides:

(1) a process for producing an ink-jet printer member which comprises melt-injecting into a mold in turn, a material for a plastics substrate and an elastic material composed of a thermoplastic elastomer to subject said materials to multi-color injection molding so that part of said plastics substrate and the elastic material layer are integrally composited; and (2) a process for producing an ink-jet printer member which comprises placing, in advance, a plastics substrate of a prescribed form in a mold, and melt-injecting an elastic material composed of a thermoplastic elastomer into said plastics substrate to subject said material to insert molding so that part of said plastics substrate and the elastic material layer are integrally composited.

Figure 1:
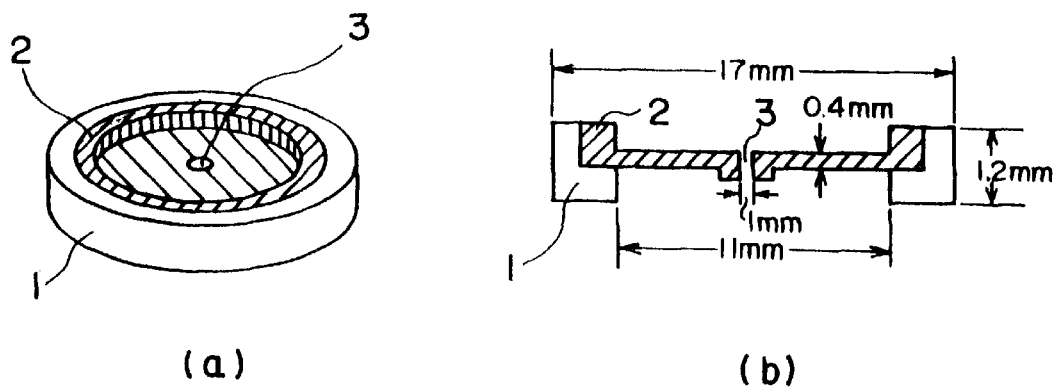
FIG. 1 is a perspective view (a) and a cross-sectional view (b) each of the ink tank valve as prepared in Example 1.

1: outer cylinder
2: valve
3: ink supply hole
4: body of recording-head portion
5: sealing member
6: ink supply hole

DESCRIPTION OF PREFERRED EMBODIMENT

The ink-jet printer member produced by the process according to the present invention comprises a plastics substrate and an elastic material layer installed thereon that are integrally composited. Such ink-jet printer member needs only to be a member in which an elastic material layer is installed on a plastics substrate without specific limitation. Preferable examples of the ink-jet printer member include an ink tank valve which is installed at the position dividing an ink chamber and an ink supply portion, and which supplies a recording head with the ink that is moved by the difference in pressure between the ink chamber and the ink supply portion, and is filled in the ink chamber; and a part item equipped with a sealing member which is installed at an ink supply port of an ink tank, and which prevents the ink from leaking through said ink supply port.

The above-mentioned ink-jet printer member comprising a plastics substrate and an elastic material layer installed thereon that are integrally composited, is produced by a multi-color injection molding method or an insert molding method. It is preferable in this case to select a thermoplastic elastomer which is inherently easily subjected to a multi-color injection molding or an insert molding, as an elastic material constituting an elastic material layer.

Such elastic material is not specifically limited, provided that it is a thermoplastic elastomer. Examples of said thermoplastic elastomer include that of styrene base, olefin base, urethane base or ester base. In particular, there is preferably used an elastic material comprising a thermoplastic elastomer of a copolymer constituted of at least one polymer block containing a vinyl aromatic compound as a principal component and at least one polymer block containing a conjugated diene compound as a principal component.

More specific examples of said thermoplastic elastomer include:

① a block copolymer of crystalline polyethylene and ethylene/butylene-styrene random copolymer, said copolymer being produced by hydrogenating a block copolymer of polybutadiene and butadiene-styrene random copolymer, and ② a diblock copolymer of crystalline polyethylene and polystyrene; a triblock copolymer of styrene-ethylene/butylene-styrene (SEBS); a triblock copolymer of styrene-ethylene/propylene-styrene (SEPS); especially block copolymer of styrene-ethylene/butylene-styrene; block copolymer of styrene-ethylene/propylene-styrene, each being produced by hydrogenating a block copolymer of polybutadiene and polystyrene and a block copolymer of polyisoprene and polystyrene or a block copolymer of polybutadiene or ethylene-butadiene random copolymer and polystyrene.

Of these, is preferable in particular, in view of durability when used as an ink-jet printer member, a hydrogenated block copolymer which is produced by hydrogenating the block copolymer constituted of at least one polymer block containing a vinyl aromatic compound as a principal component and at least one polymer block containing a conjugated diene compound as a principal component, as is included in the item ② and which has a number-average molecular weight of preferably at least 180,000, more preferably at least 200,000. The upper limit of the number-average molecular weight thereof is not specifically limited, but is usually 400,000, approx.

Of the preferable hydrogenated block copolymer which is produced by hydrogenating the block copolymer constituted of at least one (one segment) polymer block containing a vinyl aromatic compound as a principal component and at least one polymer block containing a conjugated diene compound as a principal component as mentioned hereinbefore, is more preferable, a hydrogenated block copolymer which is produced by hydrogenating the block copolymer having at least two polymer blocks containing a vinyl aromatic compound as a principal component and at least one polymer block containing a conjugated diene compound as a principal component, which block copolymer is exemplified by styrene-butadiene-styrene block copolymer and styrene-isoprene-styrene block copolymer.

Another preferable hydrogenated block copolymer is that which is similar to the above-exemplified hydrogenated block copolymer, and which is produced by hydrogenating the block copolymer constituted of at least one polymer block containing, as a principal component, a modified vinyl aromatic compound in which a carboxylic acid group or a maleic anhydride group or a molecular unit containing any of these derivative groups is bonded, and at least one polymer block containing a conjugated diene compound as a principal component.

It is desirable that the content of amorphous styrene blocks in the aforesaid block copolymer be in the range of 10 to 70% by weight, preferably 15 to 60% by weight, and also that the glass transition temperature (Tg) of amorphous styrene block segments be 60° C. or higher, preferably 80° C. or higher. Moreover, the polymer at the portion which links amorphous styrene blocks at both the terminals is also preferably amorphous, is exemplified by an ethylene-butylene copolymer, a butadiene polymer and an isoprene polymer, and may be a block copolymer or a random copolymer thereof. Any of these various thermoplastic elastomer may be used alone or in the form of a blend of at least two components.

In the above-mentioned elastic material, a softenig agent may be blended as desired for the purpose of reducing the hardness of the aforesaid thermoplastic elastomer. Said softening agent is not specifically limited, but may be arbitrarily selected for use from the softening agents which have heretofore been customarily employed for plastics and rubber. Preferably, the softening agent is a low molecular substance which has a number-average molecular weight of less than 20,000 and physical properties such as a viscosity at 100° C. of $5\times10^5$ centipoise or lower, especially $1\times10^5$ centipoise or lower. From the viewpoint of molecular weight, the softening agent has a number-average molecular weight of preferably less than 20,000, more preferably less than 10,000, particularly preferably less than 5,000. The preferably usable softening agent may be usually a liquid or in the form of liquid at room temperature, and may be hydrophilic or hydrophobic.

The softening agent having such properties can be suitably selected for use, for example, from the variety of softening agents for rubber or plastics including those of mineral oil base, vegetable oil base and synthetic oil base Examples of the mineral oil base include process oils such as naphthenic base oil and paraffinic base oil. Examples of the vegetable oil base include castor oil, cotton seed oil, linseed oil, rapeseed oil, soybean oil, palm oil, coconut oil, arachis oil, Japan wax oil, pine oil, and olive oil. Of these, are preferable an oil and at least two oils each having a number-average molecular weight in the range of 450 to 5000, and being selected from mineral oil base paraffinic oil, naphthenic oil, and synthetic base polyisobutylene base oil.

Any of these softening agents may be used alone or as a component in a mixture of at least two agents, provided that a plurality of the agents are well compatible with each other.

The blending amount of any of these softening agents is not specifically limited, but is selected in the range of usually 50 to 1,000 parts by weight, preferably 50 to 300 parts by weight based on 100 parts by weight of the above-mentioned thermoplastic elastomer. An amount of any of these softening agents, when being less than 50 parts by weight based thereon, gives rise to a fear of failure to attain sufficient decrease in hardness and sufficient flexibility of the elastic material, whereas an amount thereof, when being more than 1000 parts by weight based thereon, brings about the causes for rendering the softening agent more prone to bleed and for lowering the mechanical strength of the elastic material.

It is preferable, in the elastic material to be used in the process according to the present invention, that the high molecular organic material constituting the same has a three-dimensional continuous network skeleton construction. Moreover, the three-dimensional continuous network skeleton construction to be formed therein has an average diameter of the skeleton of at most 50 μm, preferably at most 30 μm, an average diameter of the cell(network) of at most 500 μm, preferably at most 300 μm, and a volumetric fraction of the high molecular organic material of at most 50%, preferably at most 33%, when the volumetric fraction of the high molecular organic material is defined as :[volume of high molecular organic material/(volume of high molecular organic material+volume of softening agent)]×100%.

In order to obtain the elastic material containing a larger amount of the softening agent and a smaller amount of the high molecular organic material, it is preferable to select both the softening agent and the high molecular organic material so that the difference in solubility parameter $\delta=(\Delta E/V)^{1/2}$ ($\Delta E$=molar evaporation energy, V=molar volume) therebetween becomes at most 3.0, preferably at most 2.5. The difference exceeding 3.0 is unfavorable, since a large amount of the softening agent is difficult to preserve in view of the compatibility of both the materials and in addition, the softening agent becomes more apt to cause bleeding.

The elastic material relating to the process according to the present invention may be blended as desired, with polyphenylene ether resin for the purpose of improving the compression set of the materials. The polyphenylene ether resin to be used therefor is a homopolymer composed of the repeating unit represented by the general formula or a copolymer composed of said repeating unit.

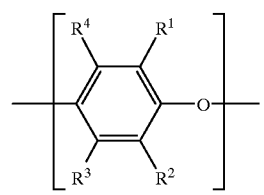

wherein $R^1$, $R^2$, $R^3$ and $R^4$ are each independently of one another, hydrogen atom, a halogen atom or a hydrocarbon group.

The polyphenylene ether resin may be selected for use from the well known ones, and is specifically exemplified by poly(2,6-dimethyl-1,4-phenylene ether); poly(2-methyl-6-ethyl, 4-phenylene ether); poly(2,6-diphenyl-1,4-phenylene ether); poly(2-methyl-6-phenyl-1,4-phenylene ether); and poly(2,6-dichloro-1,4-phenylene ether). There is also usable a polyphenylene ether copolymer such as the copolymer of 2,6-dimethylphenol and a monohydric phenols (for example, 2,3,6-trimethylphenol and 2-methyl-6-butylphenol). Of these are preferable poly(2,6-dimethyl-1,4-phenylene ether) and the copolymer of 2,6-dimethylphenol and 2,3,6-trimethylphenol, and the former is particularly preferable.

The blending amount of the polyphenylene ether resin is preferably selected in the range of 10 to 250 parts by weight on the basis of 100 parts by weight of the elastic material. An amount thereof exceeding 250 parts by weight causes a fear that the hardness of the resultant elastomer is unfavorably made excessively high, whereas an amount thereof less than 10 parts by weight unfavorably leads to insufficient effect on the improvement of compression set obtained by the blending.

The elastic material to be used in the process of the present invention may be blended with a flaky inorganic additive such as clay, diatomaceous earth, silica, talc, barium sulfate, calcium carbonate, magnesium carbonate, a metal oxide, mica, graphite and aluminum hydroxide, various metal powders, wooden pieces, glass powder, ceramics powder, granular or powdery solid filler such as granular or powdery polymer, and a variety of natural or artificial short fibers and long fibers(such as straw, glass fiber, metallic fiber and a variety of polymer fibers).

It is possible to contrive weight lightening of the elastic material by blending therein a hollow filler such as an inorganic hollow filler exemplified by glass balloon and silica balloon, an organic hollow filler composed of polyfluorovinylidene and polyfluorovinylidene copolymer. It is also possible to blend any of various foaming agents in order to improve various properties such as weight lightening of the elastic material, and it is further possible to mechanically mix a gas therein at the time of blending.

The elastic material to be used in the process of the present invention may be incorporated with an additive such as well known resin components in addition to the aforesaid components in order to improve miscellaneous properties.

As the resin components, polyolefin resin, polystyrene resin or the like can be used in combination with the elastic material. The addition of the aforesaid resin component enables the elastic material ralating to the present invention to be improved in its processability and heat resistance. Examples of the polyolefin resin include polyethylene, isotactic polypropylene, a copolymer of propylene and a small amount of an other α-olefin (for example, propylene-ethylene copolymer and propylene/4-methyl-1-pentene copolymer), poly(4-methyl-1-pentene ), and polybutene-1. In the case where isotactic polypropylene or a copolymer thereof is used as polyolefin resin, there is favorably usable a polyolefin resin having a MFR value (according to JIS K 7210) in the range of preferably 0.1 to 50 g/10 minutes, particularly preferably 0.5 to 30 g/10 minutes.

Any polystyrene resin can be used in the process of the present invention provided that it is produced by a well known process, no matter whether it is produced by radical polymerization process or ionic polymerization process. The number-average molecular weight of the polystyrene resin is selected in the range of preferably 5,000 to 500,000, more preferably 10.000 to 200,000, and the molecular weight distribution [the ratio of weight-average molecular weight (Mw) to number-average molecular weight(Mn)=(Mw/Mn)] is preferably at most 5.

Examples of the polystyrene resin include polystyrene, styrene-butadiene block copolymer having a styrene unit content of at least 60%, rubber-reinforced polystyrene, poly-α-methylstyrene and poly-p-t-butylstyrene. Any of the above-exemplified polystyrene may be used alone or in combination with at least one other. In addition, there is also usable a copolymer which is obtained by polymerizing the mixture of the monomers constituting any of these polymers.

It is also possible to simultaneously use the above-mentioned polyolefin resin and polystyrene resin. In the case where any of these resins is added to the elastic material relating to the present invention, the simultaneous use of the polyolefin resin and polystyrene resin has a tendency to increase the hardness of the resultant material as compared with the use of the polyolefin resin alone. Accordingly, the hardness of the resultant elastic material can be regulated by selecting the blending ratio of these resins. In this case the blending ratio by weight of the polyolefin resin to the polystyrene resin is preferably selected in the range of 95/5 to 5/95.

Any of these resin components, when being used simultaneously with the elastic material, should be used to the extent that the effect of the present invention is not impaired thereby. Specifically, the blending amount of said resin component is preferably in the range of 0 to 100 parts by weight, approx. based on 100 parts by weight of the thermoplastic elastomer. The blending amount of the resin component, when exceeding 100 parts by weight, unfavorably leads to an excessively high hardness of the objective elastic material.

It is possible at need to use simultaneously with the elastic material, additives exemplified by flame retardants, antimicrobial agents, hindered amine base light stabilizer, ultraviolet ray absorbers, antioxidants, colorants, silicone oils, cumarone resin, cumarone indene resin, phenol terpene resin, petroleum base hydrocarbons, various tackifiers such as rosin derivatives, various adhesive-type elastomer such as Rheostomer B (trade name, produced by Riken Vinyl Industry Co., Ltd.), a thermoplastic elastomer or a resin other than that used in the process of the present invention such as Highbler( trade name, produced by Kuraray Co.,Ltd., block copolymer in which polystyrene block is bonded to both terminals of vinyl-polyisoprene block) and Nolex(trade name produced by Nippon Zeon Co.,Ltd., polynorbornene formed by ring opening polymerization of norbornene).

The process for producing the elastic material to be used in the process according to the present invention is not specifically limited, but well known processes are applicable thereto. For example, said elastic material is readily producible by a process which comprises the steps of melt kneading the foregoing components and the additives that are used as desired by the use of a heating kneader such as a single screw extruder, a twin screw extruder, a roll, a Banbury mixer, a prabender, a kneader and a high shear type mixer; further adding as desired to the resultant mixture, a crosslinking agent such as an organic peroxide, a crosslinking aid or the like, or simultaneously mixing with the necessary components; and melt kneading by heating the resultant mixture.

The elastic material can also be produced by preparing a preliminary elastic material which is produced by kneading the high molecular organic material and the softening agent, and further mixing the resultant material with at least one high molecular organic material which is similar to or different from that to be used herein.

Moreover, the elastic material to be used in the process of the present invention can be crosslinked by adding thereto, a crosslinking agent such as an organic peroxide, a crosslinking aid and the like.

Examples of the crosslinking agent which can be added for the purpose of partial crosslinking include an organic peroxide, specifically exemplified by 2,5-dimethyl-2,5-di(t-butylperoxy)-hexane; 2,5-dimethyl-2,5-di(benzoylperoxy)-hexane; t-butylperoxybenzoate; dicumylperoxide; t-butylcumyl peroxide; diisopropylbenzohydroperoxide; 1,3-bis-(t-butylperoxyisopropyl)-benzene; benzoylperodxide; and 1,1-di(t-butylperoxy)-3,3,5-trimethylcyclohexane. Examples of useful crosslinking aid include divinylbenzene; trimetylolpropane triacrylate; ethylene dimethacrylate; diallyl phthalate; quinone dioxime; phenylenebismaleimide; polyetylene glycol dimethacrylate; and an unsaturated silane compound. The above-exemplified organic peroxide and crosslinking aid are each optionally used in an amount of 0.1 to 5 parts by weight based on 100 parts by weight of the whole amount of the blend so as to adjust the degree of crosslinking. It is possible to use two or more kinds as necessary, each of the organic peroxide and crosslinking aid. In the case where an unsaturated silane compound is used as a crosslinking aid, it is possible to proceed with crosslinking by bringing said compound into contact with water in the presence of a silanol condensation catalyst.

It has heretofore been difficult with the conventional heat-curing rubber to integrally composite a plastics substrate and said heat-curing rubber by means of a multi-color molding or insert molding. On the contrary, the process according to the present invention enables multi-color molding and insert molding to integrally composite part of a plastics substrate and an elastic material by making use of a thermoplastic elastomer such as SEBS and SEPS as the elastic material, thereby making it possible to produce an ink-jet printer member at a low cost.

In the ink-jet printer member produced by the process according to the present invention, the resin to be used as the material for the plastics substrate is not specifically limited, but may be properly selected for use according to the purpose of use of said member, from among thermoplastic resins that are exemplified by styrenic resin such as acrylonitrile-styrene (AS) resin, acrylonitrile-butadiene-styrene (ABS) resin, polystyrene and syndiotactic polystyrene; olefinic resin such as polyethylene and polypropylene; polyamide resin such as nylon; polyester resin such as polyethylene terephthalate and polybutylene terephthalate; modified polyphenylene ether; acrylic resin; polyacetal; and polycarbonate. Any of the resins may be used alone or in combination with at least one other resin.

The ink-jet printer member produced by the process of the present invention, that is, the member which comprises the plastics substrate and an elastic material layer installed on the surface thereof that are integrally composited, can be produced by any of a multi-color injection molding method and an insert molding method. The selection of more advantageous method may be properly determined according to the type of the member to be composited.

In the case of an ink-jet printer, an ink-tank valve as an example, which is installed at the position dividing an ink chamber and an ink supply portion, and which supplies a recording head with the ink that is moved by the difference in pressure between the ink chamber and the ink supply portion and is filled in the ink chamber, is usually of the structure wherein an elastic material layer is formed on the surface of a plastics substrate. In the case of producing such an ink tank valve, a multi-color injection molding method is advantageously adopted. Needless to say, the ink tank valve can be produced by an insert molding method.

On the other hand, an insert molding method is advantageously adopted in the case of producing a part item equipped with a sealing member around the sealing member which is installed at the ink supply port of an ink tank and which prevents the ink from leaking through said ink supply port, and in the case of producing a part item equipped with a sealing member around the sealing member which is installed at the connecting portion connecting an ink supply portion to a recording head. Needless to say, the aforesaid part item equipped with a sealing member can be produced by a multi-color injection molding method.

In the following, detailed description will be given of the multi-color injection molding method and insert molding method. In the multi-color injection molding method, the objective ink-jet printer member which comprises the plastics substrate and the elastic material layer placed on the surface thereof that are integrally composited, is produced by at first subjecting a material for the plastics substrate to melt injection molding in a mold by the use of an injection molding machine for exclusive use, and subsequently, while the plastics product proceeds with solidification, subjecting an elastic material to melt injection molding in the mold by the use of an injection molding machine for exclusive use so as to equip part of the plastics product with a layer of the elastic material.

The multi-color injection molding method as described before is enhanced in production efficiency and is capable of producing the ink tank valve and the like at a low cost.

On the other hand, in the insert molding method, the objective ink-jet printer member which comprises the plastics substrate and the elastic material layer placed on the surface thereof that are integrally composited, is produced by preparing in advance the plastics substrate of a prescribed form by using a material for the plastics substrate through any of well known molding method, placing the resultant plastics substrate in a mold, and subsequently subjecting the elastic material to melt injection molding in the mold by the use of an injection molding machine so that the elastic material layer is installed on part of the plastics substrate.

By the above-described insert molding method, a part item equipped with a sealing member, for example, can be efficiently produced at a low cost. As mentioned hereinbefore, there have heretofore been employed, as a method for installing a sealing member, a method in which an adhesive is applied to a plastics member, and then is molded into the form of a sealing member by pressing the same with a metal plate from the upside, and a method in which a plastics member is equipped with a sealing member of a prescribed shape prepared in advance. However, the above-mentioned adhesive-coating method involves the problems of adhesive control being troublesome, post-treatment being needed for squeezed out adhesives and the like troubles. On the other hand, the sealing member-equipping method involves the problems of increased number of processing steps due to necessity of forming in advance a sealing member of a prescribed shape, inevitably high production cost, and further difficulty in simplifying the installation step for a soft sealing member.

As opposed to the foregoing, the process of the present invention for producing the part item equipped with a sealing member by the above-mentioned insert molding method, as compared with said adhesive-coating method, has advantages capable of dispensing with the troublesome control of the adhesive and the post-treatment of flash or the like due to squeezed out adhesives. Moreover said process of the present invention, as compared with the sealing member-equipping method, has advantages capable of curtailing the production cost owing to the decreased number of production steps, and enhancing the reliability of sealing due to its capability of accurate and precise molding.

The ink-jet printer member which comprises the plastics substrate and the elastic material layer placed on the surface thereof that are integrally composited, can be produced by the process according to the present invention, that is, multi-color injection molding or insert molding, with simple production steps in high production efficiency at a low cost. The ink-jet printer member thus produced is favorably usable particularly for an ink tank valve, a part item equipped with a sealing member and the like.

In the following, the present invention will be described in more detail with reference to working examples, which however shall not limit the present invention thereto.

EXAMPLE 1

(1) Preparation of Elastic Material

An elastic material was prepared by kneading 100 parts by weight of styrene-ethylene/butylene-styrene block copolymer[number-average molecular weight of 20,000 and SP value(solubility coeffficient) of 8.5], 140 parts by weight of paraffinic base oil [producded by Idemitsu Kosan Co.,Ltd. under the trade name "PW 380", molecular weight of 750, SP value of 7.8], 13 parts by weight of polypropylene resin and 10 parts by weight of polyphenylene ether resin. The resultant elastic material had a hardness of 20 deg. according to JIS A hardness.

(2) Preparation of Ink Tank Valve by Two-Color Injection Molding Method

The ink tank valve of the shape as shown in FIG. 1 was prepared by a multi-color injection molding method. FIG. 1(a) is a perspective view of the ink tank valve prepared in the present example, and FIG. 1(b) is a cross sectional view thereof in which 1 is the outer cylinder made of polypropylene resin ; 2 is the valve made of the elastic material; 3 is the ink supply hole; and the unit of each figure is mm.

The ink tank valve comprising the outer cylinder made of polypropylene resin and the valve made of the elastic material that were integrally composited, was produced by the method comprising the steps of melt-injection-molding polypropylene resin into a mold under the conditions including a mold temperature of 60° C. and a resin temperature of 190° C. by the use of a molding machine, model No. DC40E5ASE produced by Nissei Plastic Industrial Co.,Ltd., and subsequently melt-injection-molding the elastic material as obtained in the preceding item (1) into the mold under the conditions including a mold temperature of 60° C. and a resin temperature of 190 to 230° C.

The ink tank valve thus obtained was installed on an ink tank at the position dividing an ink chamber and an ink supply portion, and then subjected to an ink supply test. As a result, said ink tank valve was capable of stably supplying a recording head portion with ink completely free from contamination due to bleeding even during and after a long-term service (120° C., 1000 hours ) almost without causing abnormality of the ink tank valve, whereby the valve itself demonstrated its sufficient function throughout the testing period of time.

EXAMPLE 2

(1) Preparation of Elastic Material

In the same manner as in Example 1 there was prepared an elastic material having a hardness of 20 deg. according to JIS hardness A.

Figure 2:
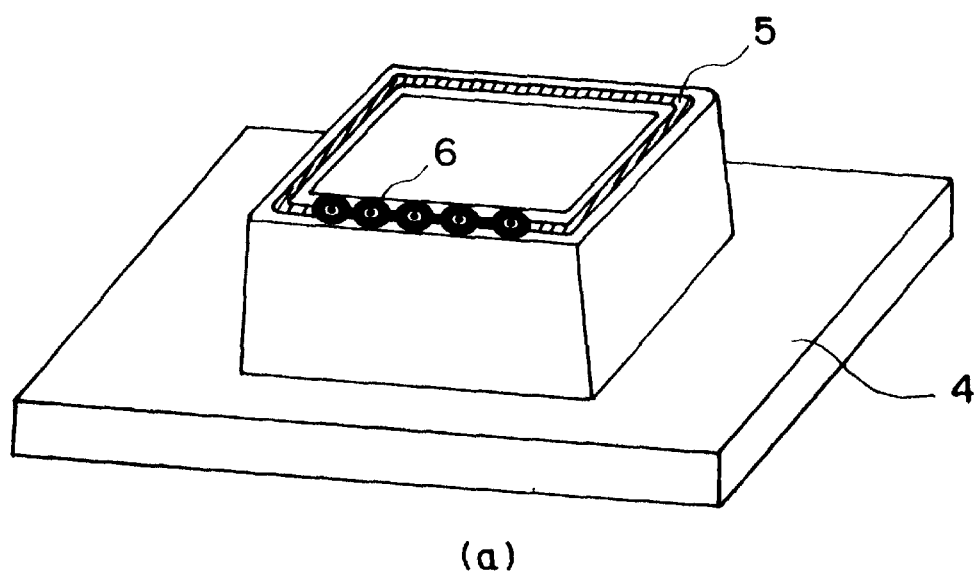
FIG. 2 is a perspective view (a) of a recording-head part item having a sealing member and a fragmentary cross-sectional view (b) around the sealing member as prepared in Example 2, wherein the symbols 1 to 6 shall have the following designations.
Figure 2:
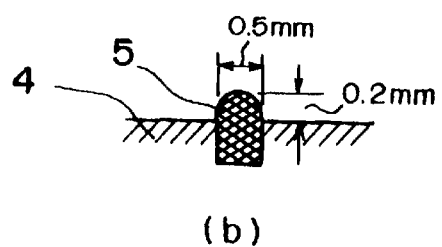

(2) Preparation of Recording Head Part-Item Equipped with a Sealing Member by Insert Molding Method The recording head part-item equipped with a sealing member of the shape as shown in FIG. 2 was prepared by an insert molding method. FIG. 2(a) is a perspective view of the recording head part-item equipped with a sealing member prepared in the present example, and FIG. 2(b) is a fragmentary cross-sectional view thereof in which 4 is the body of the recording head ; 5 is the sealing member; 6 is the ink supply hole; and the unit of each figure is mm.

The recording head part-item equipped with a sealing member comprising the body of the recording head made of modified polyphenylene ether and the sealing member made of the elastic material, said body and elastic material being integrally composited, was produced by the method comprising the steps of placing in a mold, an body of the recording head made of modified polyphenylene ether which had been prepared in advance, and melt-injection-molding the elastic material as obtained in the preceding item (1) into the mold under the conditions including a mold temperature of 60° C. and a resin temperature of 190 to 230° C. by the use of a molding machine, model No. PS20E52A produced by Nissei Plastic Industrial Co.,Ltd.

A recording head was fabricated by the use of the recording head part-item equipped with a sealing member thus obtained, and was then subjected to an intermittent ink supply and printing tests at 60° C. for one week. The tests turned out to be such results that was completely free from contamination of the ink due to bleeding or leakage of the ink through the sealing portion, and also that no evil influence upon printing was recognizable at all.

What is claimed is:

1. A process for producing an ink-jet printer member which comprises melt-injecting into a mold in turn, a material for a plastic substrate and an elastic material to subject the materials to multi-color injection molding so that part of said plastic substrate and the elastic material layer are integrally composited, the elastic material comprising a thermoplastic elastomer which is a hydrogenated block copolymer selected from the group consisting of styrene-ethylene/butylene-styrene block copolymers and styrene-ethylene/propylene-styrene block copolymers, a softening agent in an amount of 50 to 300 parts by weight based on 100 parts by weight of the thermoplastic elastomer and a polyolefin resin in an amount of 0 to 100 parts by weight based on 100 parts by weight of the thermoplastic elastomer.

2. The process for producing an ink-jet printer member according to claim 1, wherein the material for the plastic substrate is at least one member selected from the group consisting of styrenic resin, olefinic resin, polyarnide resin, polyester resin, modified polyphenylene ether, acrylic resin, polyacetal and polycarbonate.

3. The process for producing an ink-jet printer member according to claim 1, wherein the softening agent has a number-average molecular weight of less than 20,000 and a viscosity of $5 \times 10^5$ centipoise or lower at 100° C.

4. The process for producing an ink-jet printer member according to claim 3, wherein the softening agent is at least one oil selected from the group consisting of naphthenic process oils, paraffinic process oils, vegetable oils and synthetic oils.

5. The process for producing an ink-jet printer member according to claim 1, wherein the elastic material contains the polyolefm resin in an amount up to 100 parts by weight based on 100 parts by weight of the thermoplastic elastomer.

6. The process for producing an ink-jet printer member according to claim 1, wherein the polyolefm resin is a polymer selected from the group consisting of polyethylene, isotactic polypropylene, copolymers of propylene and another α-olefin, poly(4-methyl-1-pentene) and polybutene-1.

* * * * *